(12) United States Patent
Chiproot et al.

(10) Patent No.: US 9,310,002 B2
(45) Date of Patent: Apr. 12, 2016

(54) MULTILAYER HYDRAULIC SEAL ASSEMBLY FOR CLAMP

(75) Inventors: Avi Chiproot, Kfar-Saba (IL); Danny Krausz, Ramat Hasharon (IL)

(73) Assignee: Eliezer Krausz Industrial Development Ltd., Tel Aviv (IL)

( * ) Notice: Subject to any disclaimer, the term of this patent is extended or adjusted under 35 U.S.C. 154(b) by 573 days.

(21) Appl. No.: 13/534,216

(22) Filed: Jun. 27, 2012

(65) Prior Publication Data

US 2014/0001709 A1    Jan. 2, 2014

(51) Int. Cl.
| | | |
|---|---|---|
| *F16L 17/00* | (2006.01) | |
| *F16L 17/035* | (2006.01) | |
| *F16L 17/10* | (2006.01) | |
| *F16L 21/06* | (2006.01) | |
| *F16J 15/02* | (2006.01) | |
| *F16J 15/48* | (2006.01) | |

(52) U.S. Cl.
CPC ............... *F16L 17/10* (2013.01); *F16J 15/025* (2013.01); *F16J 15/027* (2013.01); *F16J 15/48* (2013.01); *F16L 17/00* (2013.01); *F16L 17/035* (2013.01); *F16L 21/06* (2013.01)

(58) Field of Classification Search
CPC ........... F16L 17/00; F16L 17/02; F16L 17/03; F16L 17/035; F16J 15/3236; F16J 15/024; F16J 15/025; F16J 15/027; F16J 15/46; F16J 15/48

USPC ........... 277/626, 627, 644, 645; 285/110, 111
See application file for complete search history.

(56) References Cited

U.S. PATENT DOCUMENTS

| | | | | | |
|---|---|---|---|---|---|
| 3,877,733 | A | * | 4/1975 | Straub | 285/105 |
| 5,941,576 | A | * | 8/1999 | Krausz | 285/110 |
| 6,293,556 | B1 | * | 9/2001 | Krausz | 277/549 |
| 6,962,373 | B2 | * | 11/2005 | Houghton | 285/110 |
| 7,243,955 | B2 | * | 7/2007 | Krausz et al. | 285/236 |
| 7,571,940 | B2 | * | 8/2009 | Krausz et al. | 285/421 |
| 7,654,586 | B2 | * | 2/2010 | Krausz et al. | 285/369 |
| 7,837,239 | B2 | * | 11/2010 | Krausz et al. | 285/421 |
| 7,997,626 | B2 | * | 8/2011 | Krausz et al. | 285/110 |
| 8,776,351 | B2 | * | 7/2014 | Bird et al. | 29/505 |
| 8,789,832 | B2 | * | 7/2014 | Gabert | 277/602 |
| 2008/0224464 | A1 | * | 9/2008 | Krausz et al. | 285/31 |
| 2010/0007137 | A1 | * | 1/2010 | Krausz et al. | 285/148.28 |
| 2011/0031737 | A1 | * | 2/2011 | Krausz et al. | 285/15 |
| 2011/0266754 | A1 | * | 11/2011 | Krausz et al. | 277/605 |

FOREIGN PATENT DOCUMENTS

WO    WO 2010080742 A1 *    7/2010    ............ F16L 17/04

* cited by examiner

*Primary Examiner* — Kristina Fulton
*Assistant Examiner* — Nicholas L Foster
(74) *Attorney, Agent, or Firm* — Dekel Patent Ltd.; David Klein

(57) ABSTRACT

A multilayer annular seal assembly including at least one outer sealing ring including at least one inner annular space and at least one inner sealing ring formed with one or more inner annular chambers.

4 Claims, 1 Drawing Sheet

MULTILAYER HYDRAULIC SEAL ASSEMBLY FOR CLAMP

FIELD OF THE INVENTION

The present invention relates generally to clamps and grip rings for pipes, and particularly to a multilayer hydraulic seal assembly for a clamp.

BACKGROUND OF THE INVENTION

Many kinds of removable band-type couplings for pipes exist in the art. It is noted that throughout the specification and claims, the term "pipe" encompasses any kind of generally cylindrical object.

U.S. Pat. No. 6,293,556 to Krausz describes a coupling for connecting pipes of the same or different diameters. The coupling has a ring shaped seal made of rubber or other resilient material, constructed of a first ring seal seated over a second ring seal. The seals can be easily disconnected from one another to allow sealing against different diameter pipes. For smaller diameter pipes, both the first and second ring seals are used; for larger diameters, only one seal is used.

In the prior art, the seal for the larger diameter has an inner space which is in fluid communication with a fluid flowing in the pipe. The fluid that enters the inner space applies pressure to increase tightening of the seal. However, the second ring seal used for smaller diameter pipes does not have such an inner space.

SUMMARY OF THE INVENTION

The present invention seeks to provide an improved multilayer hydraulic sealing assembly, as is described more in detail hereinbelow. In accordance with an embodiment of the present invention, the seal assembly includes a first ring seal seated over a second ring seal; unlike the prior art, both seals have inner spaces for fluid to flow therein to apply pressure to increase tightening of the seal and improve the degree of sealing. The seals can be easily disconnecting from one another to allow sealing against different diameter pipes.

There is thus provided in accordance with an embodiment of the present invention a multilayer annular seal assembly including at least one outer sealing ring including at least one inner annular space, and at least one inner sealing ring formed with one or more inner annular chambers.

In accordance with an embodiment of the present invention at least one supporting wall divides the chamber into two or more inner annular chambers.

In accordance with an embodiment of the present invention at least one of the sealing rings (e.g., the outermost sealing ring) includes an outer portion folded over an inner portion so as to define an inner space between and bounded by the inner and outer portions.

In accordance with an embodiment of the present invention at least one pair of adjacent sealing rings are connected to each other by a connection (e.g., male and female connection).

In accordance with an embodiment of the present invention some of the sealing rings are made of different materials and/or different thicknesses.

BRIEF DESCRIPTION OF THE DRAWINGS

The present invention will be understood and appreciated more fully from the following detailed description, taken in conjunction with the drawing in which.

DETAILED DESCRIPTION OF EMBODIMENTS

Figure 1:
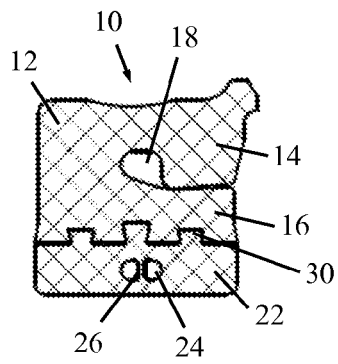
FIGS. 1 and 2 are simplified pictorial illustrations of a multilayer hydraulic seal assembly, constructed and operative in accordance with a non-limiting embodiment of the present invention.
Figure 2:
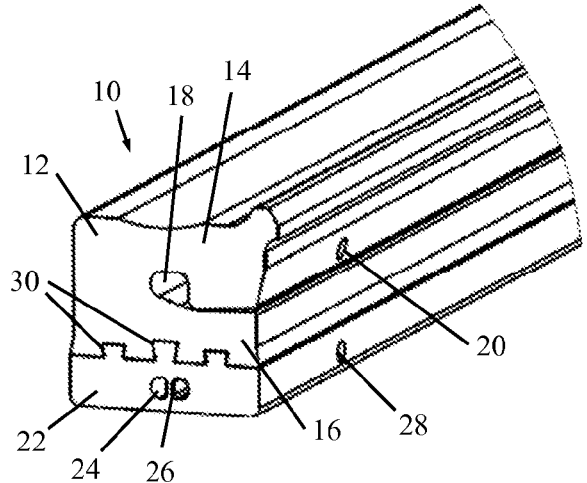

Reference is now made to FIGS. 1 and 2, which illustrate a multilayer hydraulic seal assembly 10, constructed and operative in accordance with a non-limiting embodiment of the present invention. The material of the seal may have a cross-hatched design as in FIG. 1, or smooth as is FIG. 2, or any other design.

Seal assembly 10 is particularly useful in a clamp of the type of U.S. Pat. No. 6,293,556, but the invention is not limited to this type of clamp.

Seal assembly 10 includes at least one outer sealing ring 12 constructed with an outer portion 14 folded over an inner portion 16 so as to define at least one inner annular space 18 between and bounded by the inner and outer portions 16 and 14. The inner annular space 18 is in fluid communication with a fluid (e.g., water, not shown) flowing in a pipe sealed by seal assembly 10. The fluid enters inner annular space 18 via one or more apertures 20 formed in a side wall of outer sealing ring 12 (preferably through the inner side wall of outer portion 14, but alternatively could be through inner portion 16). The fluid applies pressure in inner annular space 18 to increase tightening of the seal.

Seal assembly 10 also includes at least one inner sealing ring 22 formed with one or more inner annular chambers 24. In the illustrated embodiment, one or more supporting walls 26 divide chamber 24 into two or more inner annular chambers 24. Wall 26 prevents inner annular chamber 24 from collapsing during exposure to hydraulic forces of the fluid flow. The inner annular chamber 24 may have any size or shape.

The inner sealing ring 22 may be removed from or added to outer sealing ring 12 to accommodate different pipe diameters; it is the innermost sealing ring 22 that contacts the outer contour of the pipe and is tightened thereagainst.

The fluid enters inner annular chamber 24 via one or more apertures 28 formed in a side wall of inner sealing ring 22. The aperture 28 passes through wall 26. The fluid applies pressure in inner annular chamber 24 to increase tightening of the seal.

In accordance with an embodiment of the present invention, one or more pairs of adjacent sealing rings are connected to each other by a connection 30 (such as a male and female connection, e.g., made of protrusions received in grooves or ridges, as illustrated, or adhesive or mating roughened surfaces and the like). This may help in increasing resistance to axial forces applied by the fluid in the pipe and the sealing forces against the pipe. As seen in the drawings, the connection 30 may include protrusions and grooves of different sizes. For example, the middle protrusion and groove are larger than the left and right ones.

Figure 3:
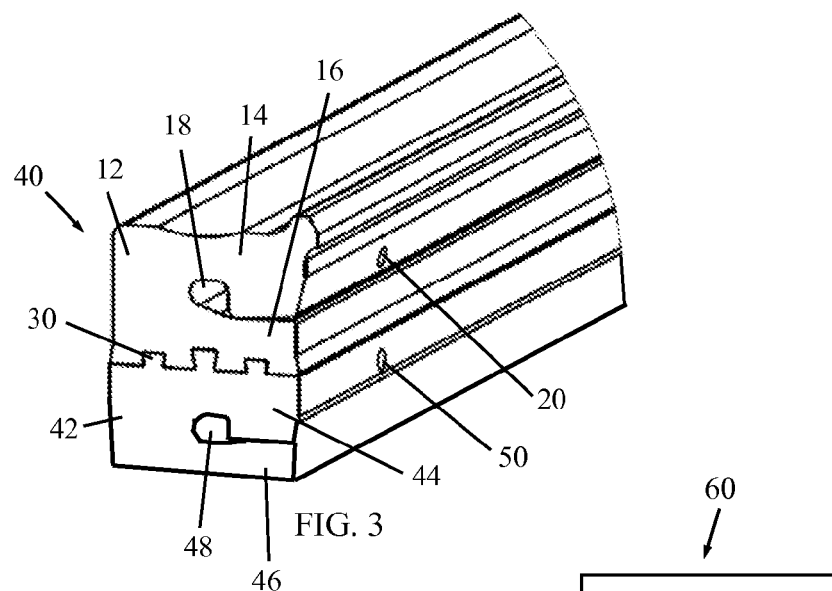
FIGS. 3 and 4 are simplified sectional illustration of multilayer hydraulic seal assemblies, constructed and operative in accordance with other non-limiting embodiments of the present invention.

Reference is now made to FIG. 3, which illustrates a multilayer hydraulic seal assembly 40, constructed and operative in accordance with another non-limiting embodiment of the present invention.

The elements common to seal assemblies 10 and 40 are designated by the same numerals. Multilayer hydraulic seal assembly 40 includes at least one outer sealing ring 42 constructed with an outer portion 44 folded over an inner portion 46 so as to define an inner annular space 48 between and bounded by the inner and outer portions 46 and 44. The inner annular space 48 is in fluid communication with a fluid flowing in a pipe sealed by seal assembly 40. The fluid enters inner annular space 48 via one or more apertures 50 formed in a side wall of outer sealing ring 42 (preferably through the inner side wall of outer portion 44, but alternatively could be through inner portion 46). The fluid applies pressure in inner annular space 48 to increase tightening of the seal. The inner annular space 48 may be on the same side as the inner annular space 18 (as in the illustrated embodiment) or they may be on opposite sides with outer sealing ring 42 inverted (e.g., male and female connection 30 would be on the opposite side of outer sealing ring 42).

Figure 4:
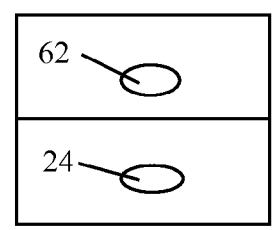

FIG. 4 illustrates another version of seal assembly 10, called seal assembly 60, including one or more inner annular spaces 62 not formed by one portion folded over the other, rather simple apertures or channels like inner annular chamber 24.

In accordance with an embodiment of the present invention some of the sealing rings are made of different materials, such as but not limited to, having different hardnesses, resilience, chemical resistance and other properties. In accordance with another embodiment of the present invention, some of the sealing rings may have different thicknesses.

The scope of the present invention includes both combinations and subcombinations of the features described hereinabove as well as modifications and variations thereof which would occur to a person of skill in the art upon reading the foregoing description and which are not in the prior art.

What is claimed is:

1. A multilayer annular seal assembly comprising:
   at least one outer sealing ring comprising at least one inner annular space, formed by an outer portion that overlies an inner portion of said at least one outer sealing ring; and
   at least one inner sealing ring, separate from and not being one unitary seal with said at least one outer ring, and formed with an inner opening and a supporting wall that divides said inner opening into two inner annular chambers which both extend annularly about main longitudinal axis of said seal assembly, wherein one or more apertures are formed in said at least one inner sealing ring in fluid connection with said inner annular chambers, said one or more apertures extending from an outer contour of said at least one inner sealing ring transversely into one of said inner annular chambers and passing through said supporting wall into the other one of said inner annular chambers, such that said inner annular chambers are completely surrounded by said supporting wall and material of said inner sealing ring along their entire annular length except for where said one or more apertures pass into said inner annular chambers;
   wherein said inner and outer sealing rings are connected to each other by a male-female connection.

2. The multilayer annular seal assembly according to claim 1, wherein said connection comprises protrusions and grooves of different sizes.

3. The multilayer annular seal assembly according to claim 1, wherein one or more apertures are formed in said at least one outer sealing ring in fluid connection with said inner annular space.

4. The multilayer annular seal assembly according to claim 2, wherein a middle protrusion and groove are larger than adjacent outer protrusions and grooves.

* * * * *